March 24, 1959  A. J. PETZINGER  2,879,475
COMPENSATING UNIT FOR WATTHOUR METER
Filed March 31, 1954  2 Sheets-Sheet 1

WITNESSES:
E. A. McCloskey.
Wm. B. Sellers.

INVENTOR
Ambrose J. Petzinger.
BY J. L. Freedman
ATTORNEY

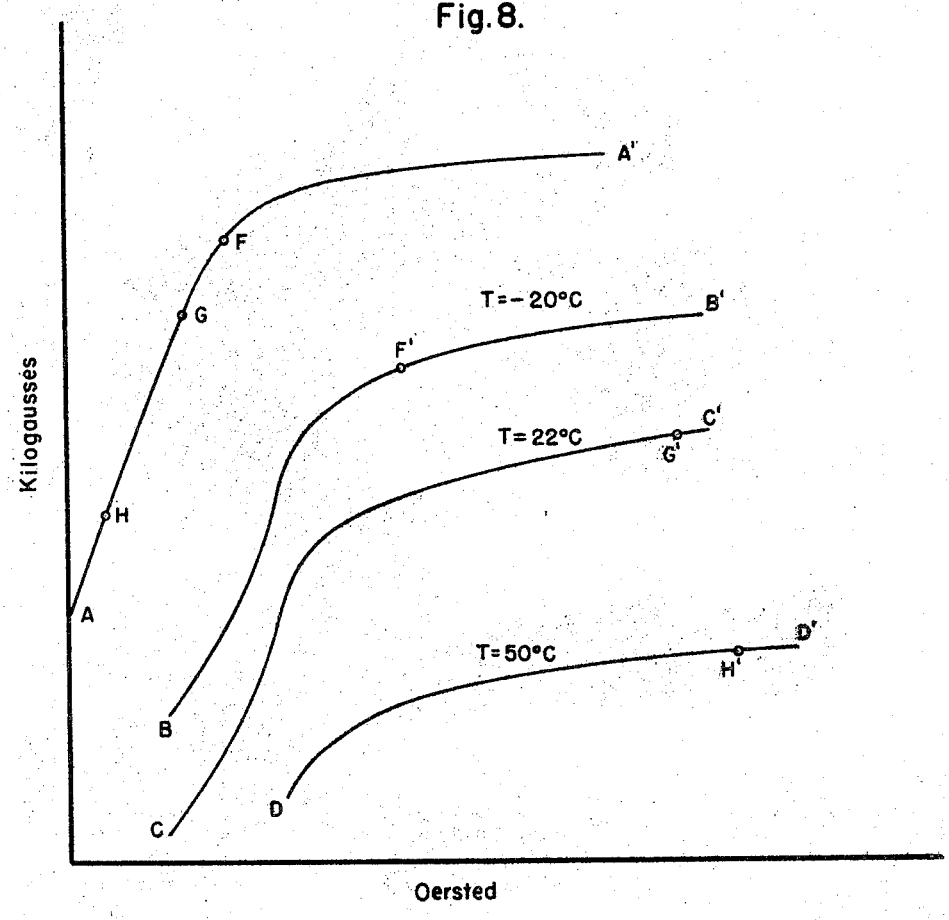

United States Patent Office

2,879,475
Patented Mar. 24, 1959

2,879,475

COMPENSATING UNIT FOR WATTHOUR METER

Ambrose J. Petzinger, Fair Lawn, N.J., assignor to Westinghouse Electric Corporation, East Pittsburgh, Pa., a corporation of Pennsylvania Application March 31, 1954, Serial No. 419,972

8 Claims. (Cl. 324—138)

This invention relates to a compensating unit including a member for establishing a predetermined displacement between the magnetic flux components of a shifting magnetic field and it has particular relation to a compensating unit which includes a lagging or quadrature adjusting member for establishing the correct displacement between the voltage and current alternating magnetic fluxes of an alternating-current watthour meter.

In accordance with the invention the compensating unit includes a lagging member for establishing a desired phase displacement between the magnetic flux components of a shifting magnetic field. The lagging member is preferably adjustable for the purpose of varying the lagging effect thereof. The compensating unit further includes temperature compensating means effective to compensate for errors in registration which are caused by variations in temperature and which are dependent upon power factor.

In a preferred embodiment of the invention, the lagging member comprises an electroconductive member disposed in the form of a loop to provide a closed path for current flowing therein. Although the loop may be of circular or square perimeter, it is preferably of rectangular configuration. In order to provide an adjustable lagging member, the lagging member is provided with a plurality of openings spaced therealong to define parallel current paths which are connected at spaced points along the lagging member. By effecting the interruption of the parallel current paths at points intermediate the points of connection of the paths, the electrical resistance of the lagging member may be varied over a substantial range for the purpose of adjusting the lagging effect thereof. Such interruption of the current paths is conveniently effected by severing portions of the lagging member which connect the openings with the inner and outer peripheries of the lagging member.

In accordance with a further aspect of the invention, the compensating unit includes a magnetic circuit member having a first magnetic part constructed of magnetic material having a negative temperature coefficient of permeability, and a second magnetic part secured to the first part. The magnetic circuit member encircles a portion of the lagging member to provide compensation for certain errors in registration of the meter caused by variations in temperature. The magnetic member preferably is insulated from the electroconductive lagging member for the purpose of eliminating undesirable variations in resistance of the flux lagging member caused by engagement of the flux lagging member and the magnetic circuit member.

The magnetic parts of the magnetic circuit member preferably are proportioned so that the permeabilities of the parts change in the same direction as the operating temperature varies to provide a magnetic circuit member effective to compensate for temperature variations over a wide range of temperature.

It is, therefore, an object of the invention to provide an improved compensating unit for an alternating-current device.

It is another object of the invention to provide a compensating unit for a watthour meter including a flux lagging member with improved means for adjusting the lagging effect thereof.

It is still another object of the invention to provide a compensating unit for a watthour meter including an electroconductive lagging member disposed in a loop to provide a closed current path with a plurality of openings spaced along the loop for defining parallel current paths connected at spaced points with portions of the loop being severable to interrupt the parallel paths for varying the electrical resistance of the lagging member.

It is a further object of the invention to provide a compensating unit including improved means for effecting compensation for temperature errors of a watthour meter.

It is another object of the invention to provide a compensating unit for a watthour meter comprising an electroconductive loop with magnetic circuit means of two part construction encircling a portion of the loop and being insulated therefrom with a first part of the magnetic circuit means being constructed of a material having a negative temperature coefficient of permeability to provide temperature compensation.

It is a still further object of the invention to provide a compensating unit as defined in the preceding paragraph wherein the two parts of the magnetic circuit means are proportioned so that the permeabilities thereof change in the same direction with a change in the operating temperature.

Other objects of the invention will be apparent from the following detailed description taken in conjunction with the accompanying drawings, in which:

Fig. 8 is a graphical representation showing a number of magnetic induction curves for certain magnetic parts of the meter of Fig. 1.

Figure 1:
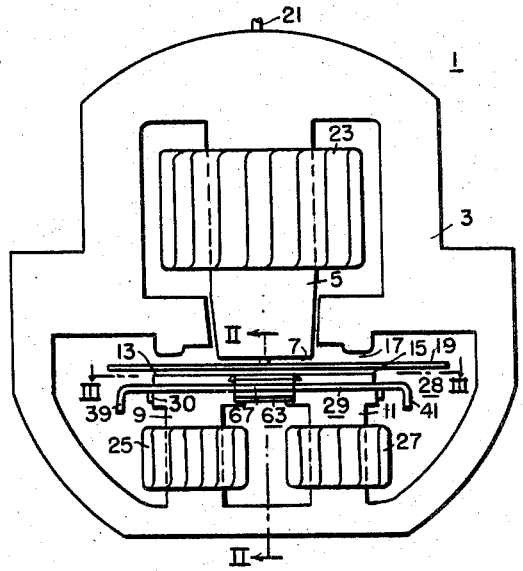
Figure 1 is a view in front elevation of a watthour meter embodying the invention.

Referring to the drawing, there is illustrated in Fig. 1 an alternating-current watthour meter 1 having a magnetic structure 3 constructed of a plurality of magnetic laminations. The magnetic structure 3 includes a voltage magnetic pole 5 having a pole face 7 and a pair of current magnetic poles 9 and 11 having respectively pole faces 13 and 15. By inspection of Fig. 1 it will be observed that the pole faces 13 and 15 are disposed in a common plane which is spaced from and parallel to the plane defined by the pole face 7 to define an air gap 17. An electroconductive disc 19 is mounted for rotation on a shaft 21 with portions of the disc 19 being positioned within the air gap 17.

In order to provide a shifting magnetic field in the air gap 17 for influencing the disc 19, the voltage magnetic pole 5 is surrounded by a voltage winding 23, and the current magnetic poles 9 and 11 are surrounded by current windings 25 and 27 with the current windings being connected in series circuit relation and being oppositely poled relative to each other. Energization of the winding 23 from a source of alternating voltage is effective to produce an alternating voltage magnetic flux which combines with alternating current magnetic flux produced by energization of the current windings 25 and 27 from a source of alternating current to provide a shifting magnetic field in the region of the air gap 17 which effects rotation of the disc 19. As thus far specifically described, the meter 1 of Fig. 1 is similar in all respects to the meter disclosed in U.S. Patent No. 2,512,345, issued to R. M. Leippe.

When the voltage winding 23 and the current windings 25 and 27 are energized, it is desirable that the magnetic fluxes produced thereby which traverse the air gap 17 have a predetermined phase relationship for an alternating current watthour meter. The phase relationship should be such that at unity power factor the two magnetic fluxes are in quadrature. In order to lag the voltage flux substantially behind the current flux, the voltage winding 23 is normally provided with a large number of turns for producing substantial inductance. However, a certain amount of resistance is present in the voltage winding (conventionally a copper winding) which prevents the establishment of the desired phase relationship between the two alternating magnetic fluxes.

In accordance with the invention, a compensating unit represented generally by the numeral 28 is provided which includes a lagging or quadrature member for the purpose of lagging one or both of the magnetic fluxes. The lagging member may be located in any desired position where it intercepts or surrounds the desired magnetic flux. In the specific embodiment of Fig. 1, a lagging member 29 is secured to the current pole pieces adjacent the air gap 17 for the purpose of intercepting and lagging voltage flux. Location of the lagging member 29 beneath the air gap 17 and the disc 19 is desirable in that it permits the provision of an air gap of minimum length and prevents the induction of voltage in the lagging member by action of the alternating magnetic flux produced by energization of the current windings 25 and 27. The member 29 is secured to the current pole pieces by means of lugs 30 bent downwardly from the member 29 to engage sides of the current pole pieces.

As is understood in the art, the lagging member 29 links a portion of the voltage magnetic flux which induces a voltage in the lagging member effective to cause current to flow through the lagging member. Such current creates a magnetic flux which combines with the voltage magnetic flux to produce a resultant magnetic flux having the desired relationship relative to the current magnetic flux.

Figure 3:
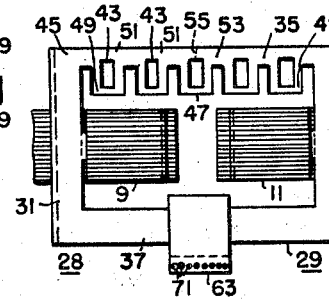
Fig. 3 is a view taken along the line III—III of Fig. 1 with parts broken away.

A preferred embodiment of the lagging member 29 is clearly shown in Figs. 1 and 3. As there shown, the lagging member 29 comprises an electroconductive member disposed in the form of a loop to provide a closed circuit path for current flowing therein. Preferably the lagging member 29 is in the form of a hollow rectangle having opposing short sides 31 and 33 and opposing long sides 35 and 37. The lagging member 29 may be constructed of any suitable electroconductive material. For example, the member 29 may be constructed of aluminum or copper. However, as will presently appear, the material selected for the member 29 preferably should be one which is quite susceptible to deformation. In order to provide a rigid structure, the member 29 may be provided with flanges 39 and 41 which are bent downwardly from the sides 31 and 33, respectively.

In order to provide a lagging member 29 having an adjustable lagging effect, the member 29 may be provided with a plurality of insulating parts in the form of openings 43 spaced along a portion of the closed path offered to current flowing in the lagging member. The openings 43 are preferably spaced along the side 35 of the member 29 and may be of any desired configuration. As disclosed, however, the openings are preferably of rectangular configuration for a purpose appearing hereinafter.

In accordance with the specific embodiment of Fig. 3 the side 35 of the member 29 is provided with an outer periphery 45 of straight-line configuration, and an inner periphery 47 having undulations defining a plurality of squared crests and hollows. As illustrated, a separate one of the openings 43 is positioned substantially within each of the crests to define with the inner periphery 47 a plurality of bridge portions 49. In a similar manner, the openings 43 define with the outer periphery 45 a plurality of bridge portions 51. By inspection of Fig. 3 it will be observed that the bridge portions 49 and the bridge portions 51 provide a pair of parallel paths for current flowing in the member 29 with the parallel paths being connected at spaced points along the lagging member by means of a plurality of additional bridge portions 53 connecting the openings 43.

It is noticed that by reason of the difference in configuration of the peripheries 45 and 47 the two parallel current paths comprising the bridges 49 in series and the bridges 51 in series are of unequal length with the path defined by the bridges 49 being of substantially greater length than the path defined by the bridges 51. By providing each of the openings 43 with a rectangular configuration, and by providing the periphery 47 with undulations defining a plurality of squared crests and hollows, the length of the current path provided by the bridges 49 may be made considerably greater than the length of the current path provided by the bridges 51. In addition, the cross-section of each of the parallel paths is substantially smaller than the cross-section of the sides 31, 33 and 37. Consequently, by interrupting one or both of the two parallel current paths at selected points between the points of connection of the two parallel paths, the effective length and cross-section of the path followed by current traversing the member 29 and, consequently, the electrical resistance of such path, may be varied over a substantial range.

In the preferred embodiment of Fig. 3, only the current path defined by the bridges 51 is subjected to interruption. Such interrupting is conveniently effected by severing one or more of the bridge portions 51 along axes connecting the outer periphery 45 and the openings 43 as indicated by the broken line 55 of Fig. 3. Conveniently, such severing is accomplished from the rear of the meter installation by the use of a suitable cutting tool operating from the outer periphery 45 of the member 29 toward the openings 43 without interference from the magnetic structure 3.

It will be observed that severance of each of the bridges 51 in succession operates to increase the effective length and decrease the effective cross-section of the path traversed by current flowing in the member 29. When all of the bridge portions 51 have been severed the resistance of the lagging member 29 is a maximum for the particular adjustment under consideration. Conversely, if none of the bridge portions 51 is severed, the resistance of the member 29 is a minimum for the particular adjustment under consideration. Intermediate values of resistance may be obtained by severing an intermediate number of bridge portions 51. If a resistance value which exceeds a desired value is obtained by severing an excessive number of bridge portions 51, one or more of the bridge portions 51 may be re-established by the application of solder or other suitable electro-conductive binding material to severed portions to obtain the desired value of resistance.

Any desired number of openings may be utilized to provide the severable bridge portions and the openings may be positioned relative to the peripheries to provide bridge portions of any desired cross-sectional area. In addition, dimensions of the crests and hollows defined by undulations of the inner periphery may be selected to provide various lengths and cross-sectional areas of the two parallel paths.

Figure 4:
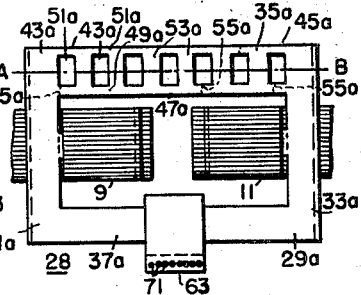
Fig. 4 is a view similar to Fig. 3 showing a modified construction of a part thereof.

Referring to Fig. 4 there is shown a lagging member 29a of different construction than the lagging member 29 of Figs. 1 and 3. The member 29a is similar in configuration to the member 29, being of rectangular configuration and having sides 31a, 33a, 35a and 37a corresponding, respectively, to the sides 31, 33, 35 and 37 of the member 29. The side 35a is provided with a plurality of openings 43a disposed in spaced relation along the side 35a. The openings 43a are arranged with the centers thereof defining a common axis which is parallel to the peripheries 45a and 47a of the side 35a. Such axis is represented in Fig. 4 by the broken line AB.

It is noticed that the bridge portions 49a and 51a defined by the openings 43a and the peripheries 45a and 47a provide two parallel current paths of substantially equal length and cross-section which are connected at spaced points along the side 35a by means of additional bridge portions 53a which connect the openings 43a. In order to vary the effective length and cross-section of the path offered to current traversing the member 29a, one or both of the parallel paths may be interrupted at selected points intermediate the points of connection of the parallel paths. By reason of the dimensions and the positioning of the openings, it is possible to vary the resistance of the member 29a over a considerable range by severing alternate ones of the bridge portions 51a and 49a as is indicated by broken lines 55a shown in Fig. 4. Severance of an increasing number of the bridge portions 49a and 51a in the manner described is effective to increase the length and decrease the cross-section of the current path to thereby increase the resistance of such path. It will be observed that some difficulty may be encountered in attempting to sever the bridge portions 49a due to the proximity of the magnetic structure 3.

Figure 5:
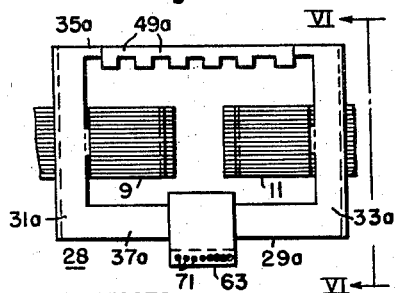
Fig. 5 is a view similar to Fig. 3 showing a part of Fig. 4 in a different position.
Figure 6:
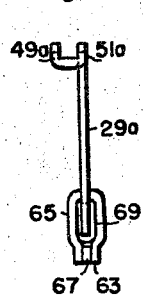
Fig. 6 is a view taken along the line VI—VI of Fig. 5.

Referring now to Figs. 5 and 6 there is shown the lagging member 29a arranged to facilitate the severance of the bridge portions 49a. As there shown, the bridge portions 49a adjacent the sides 31a and 33a of the member 29a are severed to permit the bending or folding of the portion of the side 35a containing the bridge portions 49a through an angle of approximately 180° about the axis AB. By such operation, the bridge portions 49a are positioned adjacent the bridge portions 51a and adjacent the outer periphery 45a whereby the bridge portions 49a may be severed without interference from the magnetic structure 3.

Figure 7:
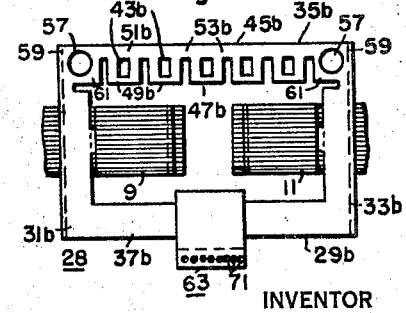
Fig. 7 is a view similar to Fig. 3 showing an additional modified construtcion of a part of Fig. 3.

With reference to Fig. 7, there is illustrated an additional modification of the lagging member of Fig. 3. As there shown, a lagging member 29b is provided which is similar in certain respects to the lagging member 29. The member 29b is of substantially rectangular configuration, having sides 31b, 33b, 35b, 37b. The side 35b is provided with an undulating inner periphery 47b and a straight-line outer periphery 45b which define with the openings 43b a plurality of bridge portions 49b, 51b, and 53b for providing a pair of parallel current paths of unequal length which are connected at spaced points along the side 35b. As thus far described, the lagging member 29b is similar in all respects to the lagging member 29.

With reference to Fig. 3, it is observed that the severance of each of the bridge portions 51 is effective to vary the resistance of the member 29 by substantially the same amount. In order to provide a lagging member having different degrees of adjustment, the lagging member 29b is provided with a pair of additional openings 57 which define bridge portions 59 and 61 with the inner and outer peripheries of the member 29b. Configurations and dimensions of the additional openings 57 may be selected to provide bridge portions 61 of smaller length and greater cross-section than the bridge portions 49b and 51b with the result that severance of one of the bridge portions 61 is effective to provide a smaller increase in resistance of the member 29b than severance of one of the bridge portions 51b or 49b. Consequently, by provision of the additional openings 57, a fine adjustment may be provided in addition to the relatively coarse adjustment provided by the openings 43b.

As will be recalled, it is desirable to provide a predetermined phase relationship between the alternating magnetic fluxes of the watthour meter for certain conditions of power factor. By means of the lagging members previously described, such phase relationship may be obtained at a given temperature. However, it is desirable that the phase relationship for a given power factor be maintained over a substantial range of temperatures. In order to provide temperature compensation for the lagging member 29, the compensating unit 28 includes a temperature compensating device 63.

Figure 2:
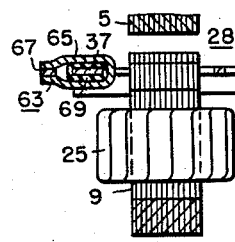
Fig. 2 is a view in section taken along the line II—II of Fig. 1 with parts broken away.

In accordance with the invention the device 63 is preferably in the form of a magnetic circuit device positioned to link a portion of the lagging member 29. The device 63 includes a U-shaped portion 65 constructed of a suitable magnetic material such as cold rolled steel. As shown in Figs. 2 and 6, the portion 65 surrounds the side 37 of the member 29. The magnetic circuit device 63 includes an additional portion 67 which is positioned to connect the ends of the U-shaped portion 65 and which is constructed of a suitable magnetic material. Preferably, the portion 67 is constructed of a magnetic material having a negative temperature coefficient of permeability such as a nickel-iron alloy. The portions 65 and 67 constitute together a magnetic circuit linking the lagging member 29 to provide reactance which decreases with increasing temperature to thereby maintain the desired lagging of the fluxes for a given power factor over a wide range of temperatures.

In order to improve the performance of the magnetic circuit device 63 means are provided in accordance with the invention for insulating the device 63 from the lagging member 29. As shown in Fig. 2 suitable insulating material 69 is positioned between the member 29 and the device 63 to surround the side 37 of the member 29 for preventing engagement of the member 29 and the device 63. The insulation 69 may comprise any suitable material and may take any desired form such as a coating which is applied to one or both of the devices 29 and 63 as by dipping or spraying.

In the absence of the insulation 69 portions of the magnetic circuit device 63 and the lagging member 29 would be in direct contact with the result that part of the current traversing the member 29 would flow through the device 63 to thereby reduce the current which is linked by the device 63. Furthermore, variations in the area of contact of the member 29 and the device 63 produced by changes in ambient temperature would cause undesirable variations of the effective resistance of the member 29.

The portions 65 and 67 of the magnetic device 63 may be secured to each other in any desired manner. In accordance with the invention the portions 65 and 67 are welded together at the points 71 with the total weld area being sufficiently large to prevent magnetic saturation of the weld area over the entire operating range of the device 63.

Referring to Fig. 8 there is illustrated a number of suitable magnetic induction curves for the portions 65 and 67 of the device 63. The curve AA' is the magnetic induction curve for the portion 65 which is constructed of cold rolled steel. The curves BB', CC' and DD' are magnetic induction curves for the portion 67, which is constructed of nickel-iron alloy, for operating temperatures of —20° C., 22° C. and 50° C. respectively.

In order to effectively employ the magnetic circuit device 63 it is desirable that the permeability of the portions 65 and 67 of the device 63 change in the same direction with changes in the operating temperature so that the reactance exhibited by the device 63 is varied as the operating temperature changes by an amount sufficient to provide compensation over a wide range of temperatures.

This is accomplished in accordance with the invention by selecting the cross-sectional areas and the length dimensions of the portions 65 and 67 so that the portion 65 is operated in a non-saturated condition, and the portion 67 is operated in a saturated condition over a wide range of operating temperatures.

By proper selection of the dimensions of the portions 65 and 67 the portion 65 may be caused to operate at points F, G and H of the curve AA', and the portion 67 may be caused to operate at the points F', G' and H' of the curves BB', CC' and DD' for operating temperatures of —20° C., 22° C. and 50° C. respectively. With such arrangement it is observed that as the operating temperature increases from —20° C. to 50° C. the permeability of each of the portions 65 and 67 is substantially decreased with the result that for such increase in the operating temperature the reactance exhibited by the device 63 is reduced by a substantial amount. By proper selection of the materials and dimensions of the portions 65 and 67 the reactance exhibited by the device 63 may be caused to vary an amount sufficient to compensate for a wide range of temperatures.

Although the invention has been described with reference to certain specific embodiments thereof, numerous embodiments thereof are possible, and it is desired to cover all embodiments falling within the spirit and scope of the invention.

I claim as my invention:

1. In an alternating current induction meter, means effective when energized for producing alternating magnetic flux, said means including a voltage magnetic pole and a pair of current magnetic poles, and a quadrature lagging unit positioned in the path of the magnetic flux, said lagging unit comprising an electro-conductive member disposed in the form of a loop, and a magnetic device disposed in the form of a loop surrounding a portion of the electroconductive member, said magnetic device comprising first and second magnetic parts, said first magnetic part being constructed of a first material having a negative temperature coefficient of permeability, and being proportioned for operation above the knee of the curve representing the ratio of magnetic induction to magnetic field intensity for said first material over the operating range of the meter, said second magnetic part being constructed of a second material having a permeability which is substantially constant over a substantial range of temperatures, and being proportioned for operation below the knee of the curve representing the ratio of magnetic induction to magnetic field intensity for said second material over the operating range of the meter.

2. A meter as defined in claim 1 wherein said first and second magnetic parts are welded together with the weld area being sufficiently large to prevent magnetic saturation of the weld area over the operating range of the meter.

3. A flux lagging member for an alternating current induction meter comprising an electroconductive member disposed in the form of a loop, said electroconductive member including a pair of spaced flanges directed outwardly of the loop for defining a channel, said channel having a plurality of spaced portions connected in series circuit relation along the channel, each of said spaced portions having a separate weakened section in each of said flanges, said weakened sections being severable along spaced axes extending toward the loop for varying the electrical resistance of the loop.

4. In an alternating current induction meter, means effective when energized for producing alternating magnetic flux, said means including a magnetic structure which includes a voltage magnetic pole and a pair of current magnetic poles, and a quadrature lagging unit positioned in the path of the magnetic flux, said lagging unit comprising an electroconductive member disposed in the form of a loop, said electroconductive member including a pair of spaced flanges directed outwardly of the loop for defining a channel, said channel having a plurality of silts spaced along the channel, each of the slits extending through the web of the channel and through a poriton of each of the flanges to define a separate weakened section of each flange, said weakened sections being severable along spaced axes extending toward the loop without interference from the magnetic structure to vary the resistance of the loop.

5. A flux lagging member for an alternating current induction meter comprising an electroconductive member disposed in the form of a loop, said electroconductive member providing a pair of parallel paths of different length dimensions and cross-sectional areas for directing current in parallel about at least a portion of the loop, said electroconductive member including a plurality of bridge portions connecting the parallel paths at spaced points along the paths, at least one of the paths being interruptable for varying the electrical resistance of the loop.

6. A flux lagging member for an alternating current induction meter comprising an electroconductive member disposed in the form of a hollow rectangle having a first side with inner and outer peripheries, said outer periphery being of substantially straight-line configuration, said inner periphery being of undulating configuration defining a plurality of crests and hollows of the inner periphery, said electroconductive member including a plurality of openings spaced along the first side with each opening positioned substantially within a separate one of the crests, said openings defining with the inner and outer peripheries a pair of parallel current paths of different length dimensions, at least one of the parallel paths being interruptable for varying the electrical resistance of the electroconductive member.

7. A flux lagging member for an alternating current induction meter, said member comprising an electroconductive loop having a rim including a rim portion with spaced inner and outer peripheries, said rim portion providing a pair of parallel current paths each having a boundary formed by a separate one of said inner and outer peripheries, each of said paths including a plurality of series-connected parts spaced along the associated boundary, the parts at one boundary being spaced from the parts at the other boundary in a first direction by a plurality of spaced insulating paths, said rim portion including a plurality of spaced bridges connecting the current paths at points spaced in a direction transverse to said first direction intermediate said insulating paths, the parts of at least one current path being severable to vary the electrical resistance of said loop.

8. A flux lagging member for an alternating current induction meter, said member comprising an electroconductive loop having a rim including a rim portion with spaced inner and outer peripheries, said rim portion having a plurality of openings spaced in a first direction, each of said openings being spaced from a separate adjacent portion of the inner periphery in a second direction substantially transverse to said first direction to define a plurality of series-connected first sections of a first current path, each of said openings also being spaced from a separate adjacent portion of the outer periphery in said second direction to define a plurality of series-connected second sections of a second current path, the spaces between said openings providing bridges connecting said first and second paths at a plurality of spaced points, at least said first sections being severable for varying the electrical resistance of said loop.

References Cited in the file of this patent

UNITED STATES PATENTS

| | | |
|---|---|---|
| 2,050,881 | Faus | Aug. 11, 1936 |
| 2,128,131 | Faus | Aug. 23, 1938 |
| 2,321,437 | Trekell | June 8, 1943 |
| 2,328,728 | Leippe | Sept. 7, 1943 |